United States Patent [19]
Monro et al.

[11] Patent Number: 6,078,619
[45] Date of Patent: Jun. 20, 2000

[54] OBJECT-ORIENTED VIDEO SYSTEM

[75] Inventors: Donald Martin Monro, Beckington; Jeremy Andrew Nicholls, Coombe Down, both of United Kingdom

[73] Assignee: University of Bath, Bath, United Kingdom

[21] Appl. No.: 09/267,365

[22] Filed: Mar. 10, 1999

Related U.S. Application Data

[63] Continuation of application No. PCT/GB97/02496, Sep. 12, 1997.

[30] Foreign Application Priority Data

Sep. 12, 1996 [GB] United Kingdom .................... 9619084
Oct. 22, 1996 [GB] United Kingdom .................... 9621983

[51] Int. Cl.[7] .................................................. H04N 7/26
[52] U.S. Cl. .......................................... 375/240; 348/420
[58] Field of Search .................................... 348/384, 390, 348/409, 415, 416, 420, 700, 701; 382/232, 233, 236, 238

[56] References Cited

U.S. PATENT DOCUMENTS

| | | | |
|---|---|---|---|
| 5,268,967 | 12/1993 | Jang ............................................. | 382/6 |
| 5,764,803 | 6/1998 | Jacquin .................................... | 382/236 |
| 5,915,044 | 6/1999 | Gardos ..................................... | 382/236 |

FOREIGN PATENT DOCUMENTS

WO 88/09101  11/1988  WIPO .............................. H04N 7/13

OTHER PUBLICATIONS

"Scalable Video By Software," J.A. Nicholls and D.M. Monro, ICASSP, 1996, pp. 1–4.
"A Hybrid Fractal Transform," D.M. Monro, Proc. ICASSP 1993, pp. V: 169–172.
"Optimum Parameters For Hybrid Fractal Image Coding," S.J. Woolley and D.M, Monro, Proc. ICASSP 1995, pp. 2571–2574.
"Rendering Algorithms For Deterministic Fractals," D.M. Monro and F. Dudbridge, IEEE Computer Graphics, Jan. 1995, vol. 15, No. 1, 32–41.
"Discrete Cosine Transform," N. Ahmed, T. Natarajan and K.R. Rao, IEEE Trans. Comput., 1974, vol. C–23, pp. 90–03.
"Optimal Quantization Strategy For DCT Image Compression," D.M. Monro and B.G. Sherlock, IEEE Proc: Vis. Image Signal Process., Feb. 1996, vol. 143, No. 1, pp. 10–14.

*Primary Examiner*—Bryan Tung
*Attorney, Agent, or Firm*—Wallenstein & Wagner, Ltd.

[57] ABSTRACT

An object-oriented video system is implemented as a two layer object model in a software-only video compressor. Quadtree decomposition on an error metric between the input and transmitted images directs the coder towards a foreground layer of active image fragments. A rate buffering system limits the bandwidth by transmitting only the foreground blocks which most improve the image and are above some error threshold. A high fidelity background layer is identified and communicated to the decoder, which can be used to redraw background fragments as foreground objects move across them. Blocks can be coded by various methods, such as fractal transforms or truncated DCTs. The system can be implemented in RISC processors without the need for dedicated hardware. It is suitable for low bit rate applications with slowly varying backgrounds, such as personal video communications over packet networks, or closed circuit TV surveillance.

26 Claims, 1 Drawing Sheet

OBJECT-ORIENTED VIDEO SYSTEM

This Application is a continuation of International Application No. PCT/GB97/02496, filed Sep. 12, 1997, now pending (which is hereby incorporated by reference).

DESCRIPTION

1. Technical Field

The present invention relates to an object-oriented video system, and in particular to a video system using object-oriented techniques to provide efficient encoding and compression of video images. The invention is particularly although not exclusively suitable for applications having images with slowly varying backgrounds, such as personal video communication over packet networks, or closed circuit TV surveillance using fixed or wireless links.

2. Background of the Invention

Video systems making use of image compression techniques have long been known for use in situations where the images have to be transmitted via a limited bandwidth, or alternatively where they have to be stored on disk or tape having limited storage capacity. One particularly effective prior art approach is described in Nicholls, J. A., and Monro, D. M., 'Scalable video by software', Proc. ICASSP 1996, pp. IV:2005–2009. This discloses a video transmission system which uses a rate buffer to achieve any desired video bandwidth by transmitting only those blocks which most improve the image. A proportion of the bandwidth is reserved for clearing up the background of the image, this being achieved by maintaining a record of the time since each individual block within the image has been transmitted. This record is updated every time a block is selected for transmission. The persistent blocks (which will naturally tend to form part of the stationary background) are sent within the reserved proportion of the overall bandwidth. The result is that over a period of time any stationary parts of the image can be sent within the reserved bandwidth to any desired fidelity. The overall apparent visual quality of the output image remains high, as the greater proportion of the bandwidth can be used by the system in transmitting the most rapidly moving parts of the image. Any stationary parts will appear to a user gradually to increase in fidelity, up to and including lossless fidelity, as they are gradually "cleared up" by transmissions within the reserved bandwidth.

It is an object of the present invention to improve on the prior art by further reducing the bandwidth required to provide an image at a given fidelity.

SUMMARY OF THE INVENTION

According to a first aspect of the present invention there is provided a coder for an object-oriented video system, the coder comprising
(a) Input image means for receiving a sequence of input images, together defining a moving image, for coding;
(b) An object separator arranged to separate out from the moving image a foreground object and a background object, the background object being relatively motionless with respect to the foreground object; and
(c) A block coder arranged to code and sort blocks of the image and to produce an output data stream for storage or onward transmission, each coded block within the data stream being identified as relating either to the foreground or to the background object.

The invention further relates to an object-oriented video system including a coder of the above-identified type.

In particular, according to a second aspect of the present invention, there is provided an object-oriented video system comprising:
(1) A coder having:
(a) Input image means for receiving a sequence of input images, together defining a moving image, for coding;
(b) An object separator arranged to separate out from the moving image a foreground object and a background object, the background object being relatively motionless with respect to the foreground object; and
(c) A block coder arranged to code and sort blocks of the image and to produce an output data stream for storage or onward transmission, each coded block within the data stream being identified as relating either to the foreground or to the background object.

The invention also relates to a method of operating a video system and/or to a method of coding moving image data.

According to a further aspect of the present invention there is provided method of operating a video system comprising:
(a) receiving a sequence of input images, together defining a moving image;
(b) separating out from the moving image a foreground object and a background object, the background object being relatively motionless with respect to the foreground object; and
(c) coding and sorting blocks of the image and producing an output datastream for storage or onward transmission, each coded block within the datastream being identified as relating either to the foreground or to the background object.

More generally, the invention also extends to an object-oriented system for coding video images, where the objects are selected so as to optimise or at least to improve fidelity for a given band width.

The invention further extends to an object-oriented system where at least one of the objects is defined as "background", that is that part of the moving picture or image that is stationary or that is changing slowly relative to the rest. The "background" may be allocated a fraction of the available bandwidth in such a way that, over a long period, transmission of the background is without loss of fidelity.

The invention further extends to an object-oriented video system/codec (coder/decoder) where the system keeps a record of the background object and therefore provides a means of allowing foreground objects to move across the background; the background can be re-drawn from memory without being re-set, thereby providing a further means of reducing the bandwidth requirement.

In other embodiments there may be more than one background object and/or more than one foreground object.

The coder of the present invention is particularly convenient, in that it may be implemented in a software-only video compressor. Preferably, quadtree decomposition on an error metric between input and transmitted images directs the coder towards the foreground object, which represents active image fragments. A rate buffering system may limit the bandwidth by transmitting only those foreground blocks which most improve the image, and which are above some error threshold. The high fidelity background object is identified and communicated to a decoder, which can in the preferred embodiment be used to re-draw background fragments as foreground objects move across them. Blocks may be coded by various methods, such as by fractal transforms or by truncated DCTs. The system may be implemented in RISC processors without the need for dedicated hardware. It is particularly suitable for low bit rate applications with slowly varying backgrounds, such as personal video communications over packet networks, or closed circuit TV surveillance. Ideal applications include those in which the available video bandwidth varies between 10 Kbits per second and 2 Mbits per second.

In one preferred embodiment, the invention may be implemented as an add-on product for a conventional computer network. With the addition of a conventional video camera and a conventional frame-grabber board, a sequence of input images may be provided to the coder of the present invention. The coder may conveniently be implemented by programming of a computer terminal on the network, with the output datastream being sent across the network, and therefore available to be studied by any other computer on the network having a suitable decoder. Alternatively, the coder of the present invention may, in another embodiment, be incorporated within the video camera itself This would allow potential users simply to purchase a video camera/decoder unit which could be plugged straight into the network, via an appropriate adapter, to modify the output stream into the required signal protocol that the network happens to be using.

When the invention is used for surveillance applications, the output datastream may be directed to an appropriate storage medium, for example a local hard disk or a remote hard disk on the network. A user may then recover the information from the disk, at leisure, and having decoded it view it as a reconstructed moving image on any preferred local terminal.

BRIEF DESCRIPTION OF THE DRAWING

The invention may be carried into practice in a number of ways and one specific example will now be described, by way of example, with reference to FIG. 1 which is a functional block diagram of the preferred embodiment.

DESCRIPTION OF THE PREFERED EMBODIMENTS

Figure 1:
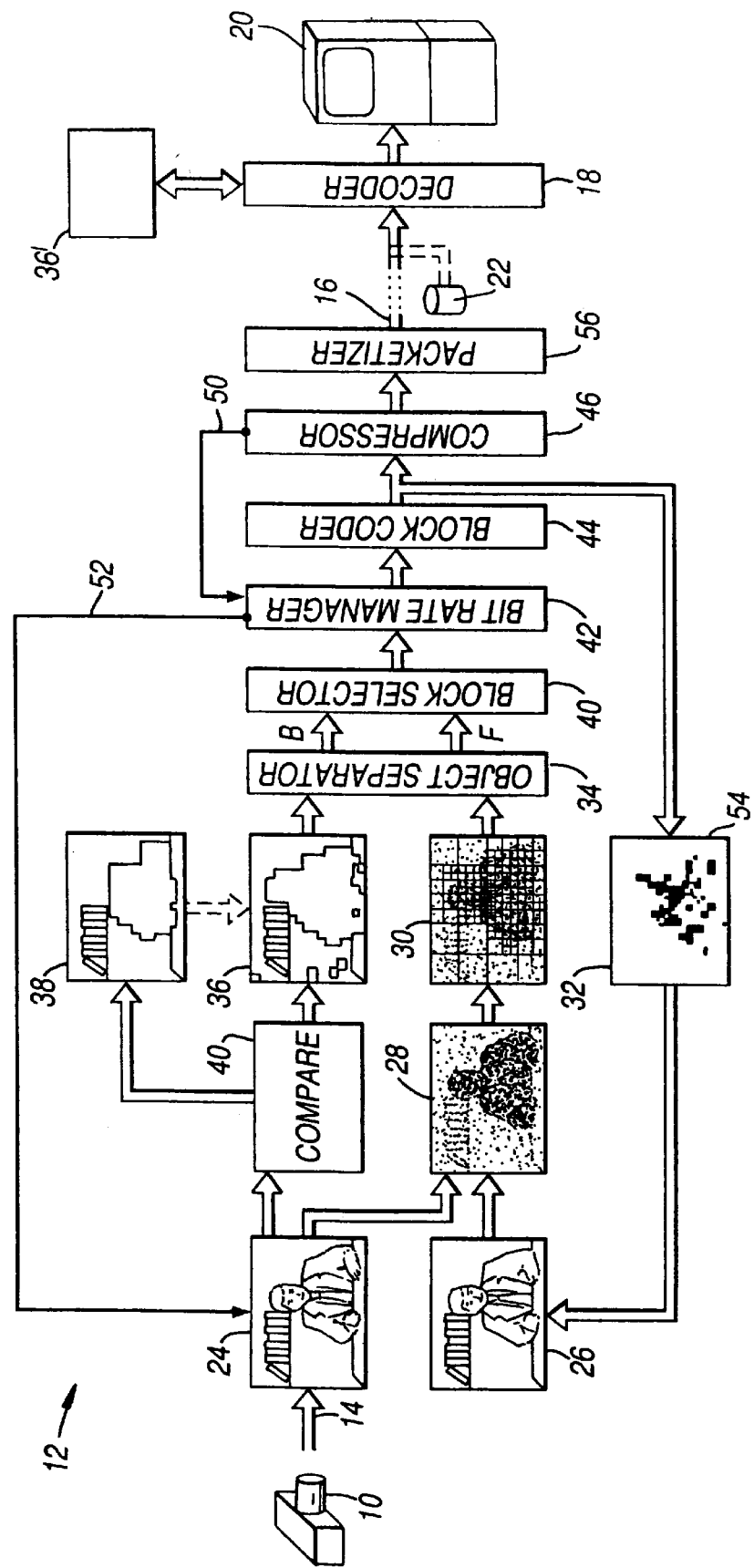

The Object-Oriented Video System shown in FIG. 1 comprises a video camera and digitizer 10 and a coder generally indicated at 12. Digitized video signals are provided along a line 14 to the coder 12 which is adapted to encode the signals and transmit them to a remote location along a bandwidth-limited transmission medium schematically shown at 16. The form of the transmission medium, linking the coder 12 with the remote site, will depend upon the application but it could include a wireless or fixed link, a packet switched network, or any other type of computer or telecommunications network.

At the remote site, the coded signals are picked up from the transmission medium by a decoder 18 which decodes them and converts them into signals suitable for reproducing the video images on a display 20. A user of the system can therefore view, in real time, video images of the scene to which the camera is directed.

Alternatively, or in addition, a video store 22 may be provided for storing the encoded real time images provided by the camera. The user may then view the stored images later, at leisure. The video store 22 could comprise any suitable storage medium, for example a magnetic or optical disk, magnetic tape, computer memory and so on.

The coder 12, which encodes and compresses the video data before placing it on the transmission medium 16, will now be described in more detail.

The coder 12 receives the incoming digitized images, frame-by-frame, from the line 14. The digitized video frames may be presented at any required rate and at any resolution, dependent upon the application. In the preferred embodiment, the resolution is a multiple of 32×32. Preferably, the colour model used by the system is YUV format, in which the data is represented by 8 bits per pixel with the U and V channels being sub-sampled by a factor of 2 in both spatial directions.

Each input frame 24 is read, pixel by pixel, into computer memory and is there compared with a previously stored image 26. The stored image 26 is a copy of the image that has been transmitted by the system, assuming that there were no errors in transmission; the mechanism by which this stored image is created will be described below.

For each of the input frames 24, an error image 28 is computed as the magnitude squared of the vector difference in a weighted colour space between the stored image 26 and the new input frame 24. It will be understood, of course, that other differencing methods could be used to compare the input image and the stored image.

Next, the error image 28 is partitioned into a plurality of tiles 30, each of which is of a predefined size, for example 32×32 pixels. Each tile then undergoes "quadtree decomposition", with a view to splitting the tile up into a series of smaller blocks, each of which contains approximately the same mean squared error (or "error power"), taken over the pixels within that block. The procedure is as follows:

(a) the total squared error for each of the initial tiles is calculated;
(b) all the tiles are examined to find the tile that has the highest square error and is also eligible to be split;
(c) split the tile found in step (b) into four smaller tiles of equal size, and calculate the total squared error for each of the new tiles;
(d) the total number of tiles to be examined has now increased by three;
(e) repeat the process, i.e. go to step (b), until either there are no further eligible tiles to split, or the maximum number of tiles has been reached.

Tiles that are eligible to be split have to be larger than the smallest allowed tile size.

The depth of the quadtree and the number of final blocks may be adjusted to match the channel conditions. A minimum block size may also be predefined, for example 2×2 or 4×4 pixels.

The result of the quadtree decomposition is that the error image 28 is partitioned as shown at 32 into a plurality of different sized blocks, each of which has approximately the same mean squared error when summed over the pixels within that block. This approach tends to direct the smallest blocks to the most active areas in reasonably noise-free images.

Once the image partitioning is completed, a calculation is made for each block within the partition to calculate the mean squared error improvement to the error image that could be achieved by transmitting that particular block. The list of blocks within the partition 32 is then sorted, based upon this mean squared error value, giving priority to the blocks that would most improve the error image 28.

The resultant sorted list is passed to an object separator 34, the purpose of which is to separate out from the image a background object and a foreground object.

In order to separate out the background object from the foreground object, the system maintains a model of the luminance (Y) background of the image. In order to do this, it constructs two separate versions of the background within the coder, the accepted background 36 and the potential background 38. Each new frame or input image 24 is compared at 40 with both the potential background 38 and with the accepted background 36, based upon a mean squared error threshold for a partition of preferably 4×4 pixel blocks. If a given 4×4 block matches the accepted background 36 within a predetermined threshold, it is labelled as such. If the block matches the potential background 38 better than the accepted background 36, then the block is averaged with the corresponding potential background block and placed back in the potential frame. Every time this occurs a corresponding hit value is incremented. Once this value exceeds a predefined threshold, the potential block is now regarded as new background, and is copied over to the corresponding block in the accepted background image 36. This averaging process smoothes out noise while allowing for genuine gradual changes in the scene, for example cars parking or the sun setting.

The accepted background 36 is passed to the object separator 34, which assumes, within this model, that anything within the accepted background 36 comprises the "background object", while anything else comprises the "foreground object". The object separator 34 provides information on the foreground object F and the background object B to a block selector 40, the purpose of which is to determine the optimal order in which various portions of the image are to be transmitted.

The bit budget for a frame is divided between background objects and foreground objects, with typically 10% of the available bandwidths being reserved for transmission of the background object. The list of blocks to be sent, in priority order, which is maintained by the block selector, is appropriately adjusted to allow for the correct proportion of blocks which form part of the foreground object and blocks which form part of the background object.

The ordered list of blocks to be sent is then passed via a bit-rate manager 42 to a block coder 44. The block coder provides an individual address for each block to be sent, using the quadtree data structure. In one embodiment, each individual block may be labelled according to the address of its parent tile 30 (numbered 1 to 20 in the FIG. 1 embodiment), along with the quadtree data structure for that particular block—a series of split/don't split instructions. Each block is also associated with one of three tags:

(a) new background;

(b) known background;

(c) foreground.

If the block relates to new background or to foreground, the data corresponding to that block needs to be transmitted to the decoder, and accordingly data representative of the image fragment covered by that block is appended. On the other hand, if the block represents known background, the data will already have been transmitted, and the decoder will be aware of it; accordingly, no additional data needs to be appended for such a block. It will be understood that the data for each block includes colour (UV) information as well as luminance (Y) information.

The ordered blocks are compressed by the compressor 46 and are then sent one-by-one to the decoder. The number of bits actually transmitted is passed back as indicated at 50 to the bit-rate manager 42 which itself determines when a signal 52 is to be sent forcing the loading of a new frame 24. Since the system does not know, a priori, what it will cost in terms of bits to send a particular image, the blocks are taken one by one, with the block selector 40 and the bit-rate manager 42 adjusting the foreground and background budget as required. As individual blocks are transmitted, the block coder 44 provides block update information 54 which is used to update the currently stored image 26. This stored image accordingly represents a copy of the transmitted image, assuming that there were no errors in transmission.

The system may use any convenient coding and compressing scheme, dependent upon application. Conveniently, those blocks which are flagged as background are sent at a lower compression than those flagged as foreground, or they may even be sent entirely uncompressed. For maximum robustness, particularly where the transmission medium 16 may be subject to information loss, the individual blocks are coded and transmitted as replacements of image fragments. Alternatively, in a lossless or near-lossless communications environment, it would be possible to update some or all of the chosen blocks differentially.

Suitable block coders 44 for use within the present application include fractal coders and/or truncated DCT coders. The preferred fractal coding technique uses the Bath Fractal Transform (BFT), described in Monro, D. M., 'A hybrid fractal transform', proc. ICASSP 1993, pp V: 169–172. A suitable biquadratic form of the BFT, for use with the present system, uses the following function, where for each k there is a recursive mapping of image blocks f (x,y) onto themselves:

$$v_k(x,y,f) = a + b_x x + b_y y + c_x x^2 + c_y y^2 + ef(x, y)$$

The applicant has found that the non-searching case of the BFT, combined with the accurate fractal rendering algorithm (AFRA) is fast enough to provide the basis for real time video compression, when used in conjunction with the present invention. The non-searching BFT is described in Woolley, S. J., and Monro, D. M., 'Optimum parameters for hybrid fractal image coding', Proc. ICASSP 1995, pp. 2571–2574: the Accurate Fractal Rendering Algorithm is disclosed in Monro, D. M., and Dudbridge, F., 'Rendering algorithms for deterministic fractals', IEEE Computer Graphics, 1995, Vol. 15, No. 1, 32–41.

Alternatively, a truncated DCT may be used for the coding of certain blocks, simply by computing only a limited number of DCT coefficients. The DCT is described in Ahmed, N., Natarajan, T., and Rao, K. R., 'Discrete cosine transform', IEEE Trans. Comput., 1974, Vol. C-23, pp. 90–93; and Monro, D. M., and Sherlock, B. G., 'Optimal quantization strategy for DCT image compression', IEE Proc: Vis. Image Signal Process., 1996, Vol. 143, No. 1, pp. 10–14.

In one version of the system, as shown in FIG. 1, once the compression stage has been completed, the quadtree and compressed data for each tile are "packetized" to provide some level of error protection. This allows for some of the transmitted data to be corrupted, and for the system to remain in a synchronised state.

There are of course many ways in which the individual blocks may be sorted into priority order, and transmitted. Depending upon application, the information could be sent on a tile by tile basis, with the quadtree structure along with the corresponding data being packetized and sent just for an individual tile. Alternatively, the priority list could be calculated for the entire image, with each block having associated with it information on the tile within which it falls, as well as details of the quadtree data structure. It would also be possible, if desired, to use the quadtree data structures only for the foreground object, and to transmit the background object in some other way, for example sequentially block-by-block, according to the band widths available.

The decoder 18 retains in memory a copy 36' of the background which it has already been sent. If a portion of the background is temporarily covered by moving foreground, which then moves out of the way to reveal the background again, that background can be recovered from the copy 36' maintained by the decoder rather than being resent across the transmission medium 16. The decoder is instructed to make use of such previously stored background when it receives a block which is flagged "known background", as discussed above. This results in an increase in compression for a given fidelity, or higher fidelity for a given bandwidth as more foreground blocks may then be sent within the same bit budget.

The system may adapt itself to the video or channel conditions by adjusting its internal parameters dynamically. The image dimensions may be adjustable, and may for example be any multiple of 32 pixels in either direction. The system also maintains an initial upper band on the bandwidth, with related frame rates, quadtree limits, and background percentages based on experience. There are also error thresholds in both the rate buffering and the object separator modules to limit the effects of camera noise; these may also be used to mitigate small changes in the scene such as slight motion in vegetation or ripples on water.

The system may adapt itself to channel conditions in two major ways. If the loss of bandwidth is small, fewer blocks are encoded and transmitted. If the bandwidth reduction is severe, on the other hand, the quadtree partition is reduced so that the majority of the blocks are larger; furthermore, the frame rate may also be lowered. This will result in more of each frame being transmitted, but at a lower fidelity.

If there is a high bandwidth available, the system will partition with a deep quadtree, resulting in many small blocks. These may then be sent uncoded, along with a higher percentage allotted to the background. This may result in an almost lossless background combined with a high fidelity foreground.

In a further embodiment, the system is arranged to re-send (replace) each of the tiles 30 in a pseudo random sequence, whether or not the system considers such re-sending to be necessary This is useful, particularly in lossy environments, to compensate for possible errors in the previous sending of one or more tiles. Although the replacement of the tiles could be on a sequential basis, a pseudo random sequence is preferred since it is less obvious to a user viewing the video on the display 20. Alternatively, of course, some non-random but also non-consecutive replacement order could be used. The rate of replacement of the individual tiles could be adjusted, either manually or automatically, depending upon the expected or actual noise or losses within the system. Similarly, the ratio of redrawn to differentially updated blocks could be varied dependent upon the same criteria. This may depend upon the picture size and the bit rate.

In the preferred form of the invention, the system is designed to send the whole of the foreground object, as best it can, within the bit limit available. An alternative would be to instruct the system to send the foreground at a given resolution, with as much as possible of the foreground object being sent in the time available. The latter approach has the disadvantage, of course, that a part of the picture will be left unsent if the system reaches the bandwidth limit.

Although no motion compensation is provided for in the preferred embodiment, it will be appreciated that if time allows such motion compensation could be incorporated both for the background and/or for the foreground objects. This could be particularly useful where the background is known to be moving at a regular rate, for example due to motion of the video camera 10.

It will be understood that the entire coder 12 may be implemented in software, for example in a RISC processor. No specialist cards are required to perform compression. Indeed, if the system were to be implemented within the camera 10 itself, as is feasible, there would be no need for a separate computer to be involved in the coding and transmitting of the data.

While the system has been described in conjunction with a two-layer object model, it will be evident to the skilled man that additional layers could be provided using identical techniques. For example, the system might define "long-term background" as anything that remains stationary for several minutes, "short-term background" as anything that remains stationary for several seconds, and "foreground" as everything else. Further layers of complexity, along the same lines, are of course conceivable.

The invention claimed is:

1. A coder for an object-oriented video system, the coder comprising
   (a) Input image means for receiving a sequence of input images, together defining a moving image, for coding;
   (b) An object separator arranged to separate out from the moving image a foreground object and a background object, the background object being relatively motionless with respect to the foreground object, the object separator utilizing
      (i) a potential background store, within which is built up, over a plurality of input images a potential background, and
      (ii) an accepted background store within which is stored at least some parts of the potential background which have persisted for a desired period; and
   (c) A block coder arranged to code and classify blocks of the image and to produce an output date stream for storage or onward transmission, each coded block within the data stream being identified as relating either to the foreground or to the background object.

2. A coder as claimed in claim 1 in which those blocks in the output data stream that relate to the foreground object are flagged as such.

3. A coder as claimed in claim 1 in which those blocks in the output data stream that relate to the background object are flagged as such.

4. A coder as claimed in claim 1 in which the output data stream is arranged to include background object blocks and foreground object blocks in a predefined order and sequence.

5. A coder as claimed in claim 1 in which the moving image is partitioned into a plurality of input blocks which are compared, block by block, with corresponding blocks in similar partitions of the stored accepted background object and the stored potential background object.

6. A coder as claimed in claim 5 in which each block in the accepted background object is overwritten by the corresponding block in the potential background object when the potential background object block is repeatedly found to be more similar to the corresponding input block than to the accepted background block.

7. A coder as claimed in claim 1 in which each block in the output data stream is identified as one of three types:
   (a) a newly-sent block from the background object;
   (b) a previously-sent block from the background object; and
   (c) a block from the foreground object.

8. A coder as claimed in claim 7 in which block types (a) and (c) have associated with them data representative of the image fragment covered by the block.

9. A coder as claimed in claim 7 or claim 8 in which block type (b) has associated with it an instruction, comprehensible to a compatible decoder, to redraw the image fragment covered by the block from the known background.

10. A coder as claimed in claim 1, wherein the coder is, arranged to maintain the background object according to its Y-luminance values.

11. A coder as claimed in claim 1 in which the stored accepted background object is representative of image fragments which have previously been coded and placed in the output stream as blocks identified as relating to the background object.

12. A coder as claimed in claim 1, further including update means for forcing a re-send of selected portions of the moving image, whether or not previously sent.

13. A coder as claimed in claim 12 in which the update means repeatedly re-sends the selected portions of the moving image in pseudo-random order.

14. A coder as claimed in claim 12 or claim 13 in which the update means re-sends the selected portions of the image at a variable frequency.

15. A coder as claimed in claim 14 in which the variable frequency of the update means is adjustable, based on the actual or expected noise to which the output data stream is subject.

16. A coder as claimed in claim 1, wherein the coder is implemented by means of a programmed computer processor.

17. An object-oriented video system comprising:
(1) A coder having;
  (a) Input image means for receiving a sequence of input images, together defining a moving image, for coding;
  (b) An object separator arranged to separate out from the moving image a foreground object and a background object, the background object being relatively motionless with respect to the foreground object, the object separator utilizing
    (i) a potential background object store, within which is built up, over a plurality of input images, a potential background, and
    (ii) an accepted background object store within which is stored at least some parts of the potential background which have persisted for a desired period;
  (c) A block coder arranged to code and sort blocks of the image and to produce an output data stream for storage or onward transmission, each coded block within the data stream being identified as relating either to the foreground or to the background object; and
(2) A decoder adapted to receive the output data stream and to create a video signal therefrom.

18. A system as claimed in claim 17 in which the decoder includes memory means for storing the background object insofar as it is known to the decoder.

19. A system as claimed in claim 18 in which the decoder includes background-reuse means arranged to incorporate within the video signal a fragment of the stored background object on receipt of an instruction to do so from the coder.

20. A system as claimed in claim 19, further including a video camera, adapted to provide the sequence of input images, the camera having a camera body.

21. A system as claimed in claim 20 in which the coder resides inside the camera body.

22. A system as claimed in claim 17 in which the coder comprises a programmed digital computer.

23. A method of operating a video system comprising:
(a) receiving a sequence of input images, together defining a moving image;
(b) separating out from the moving image a foreground object and a background object, the background object being relatively motionless with respect to the foreground object, including maintaining a potential background object store, within which is built up, over a plurality of input images, a potential background, and an accepted background object store within which is stored at least some parts of the potential background which have persisted for a desired period; and
(c) coding and sorting blocks of the image and producing an output datastream for storage or onward transmission, each coded block within the datastream being identified as relating either to the foreground or to the background object.

24. A method as claimed in claim 23, further including a computer storage medium holding a computer program.

25. A method as claimed in claim 26, wherein the medium comprises a computer disk.

26. A coder as claimed in claim 1 in which the block coder is arranged to sort as well as classsify blocks of the image.

* * * * *

UNITED STATES PATENT AND TRADEMARK OFFICE
CERTIFICATE OF CORRECTION

PATENT NO.   : 6,078,619
DATED        : June 20, 2000
INVENTOR(S)  : Donald Martin Monro and Jeremy Andrew Nicholls It is certified that error appears in the above-identified patent and that said Letters Patent is hereby corrected as shown below:

Title page,
Delete "Object Oriented Video System" and insert therefor -- Object Based Video Coding Using Foreground/Background Block Classification --

Column 3,
Line 20, after "itself" insert -- . --

Column 8,
Line 20, after "images" insert -- , --
Line 36, delete "date" and insert therefor -- data --

Column 10,
Line 16, delete "19" and insert therefor -- 17 --
Line 43, delete "26" and insert therefor -- 24 --

Signed and Sealed this

Ninth Day of October, 2001

Attest:

NICHOLAS P. GODICI
Attesting Officer   Acting Director of the United States Patent and Trademark Office